US007216162B2

(12) United States Patent
Amit et al.

(10) Patent No.: US 7,216,162 B2
(45) Date of Patent: May 8, 2007

(54) METHOD OF SURVEILLING INTERNET COMMUNICATION

(75) Inventors: Noah Amit, Haifa (IL); Yoni Amit, Haifa (IL); Zvi Eadan, Yavne (IL)

(73) Assignee: Verint Systems Ltd., Tel Aviv (IL)

( * ) Notice: Subject to any disclaimer, the term of this patent is extended or adjusted under 35 U.S.C. 154(b) by 751 days.

(21) Appl. No.: 10/052,349

(22) Filed: Jan. 23, 2002

(65) Prior Publication Data
US 2002/0116512 A1 Aug. 22, 2002

Related U.S. Application Data

(63) Continuation of application No. PCT/IL01/00471, filed on May 23, 2001.

(30) Foreign Application Priority Data
May 24, 2000 (IL) .................................... 136324

(51) Int. Cl.
G06F 15/173 (2006.01)
G06F 15/16 (2006.01)
(52) U.S. Cl. ...................... 709/224; 709/223; 709/203; 709/224; 726/3
(58) Field of Classification Search ................ 709/224, 709/223, 232, 203; 726/3, 13
See application file for complete search history.

(56) References Cited

U.S. PATENT DOCUMENTS 5,951,643 A 9/1999 Shelton et al.

| 6,584,504 | B1 * | 6/2003 | Choe ........................... 709/224 |
| 6,725,263 | B1 * | 4/2004 | Torres ......................... 709/223 |
| 6,738,355 | B1 * | 5/2004 | Love et al. .................. 709/224 |
| 6,804,701 | B2 * | 10/2004 | Muret et al. ................ 709/203 |

FOREIGN PATENT DOCUMENTS

| EP | 0 899 695 A1 | 3/1999 |
| WO | WO 98/20434 | 5/1998 |

OTHER PUBLICATIONS

Jenkins, R. "Why Web-based Network Monitoring? Leveraging the Platform", 1999, John Wiley & Sons, International Journal of Network Management 9, pp. 175-183.*

* cited by examiner

*Primary Examiner*—Bunjob Jaroenchonwanit
*Assistant Examiner*—Ramsey Refai
(74) *Attorney, Agent, or Firm*—Morrison & Foerster LLP

(57) ABSTRACT

A network probe terminal for surveillance of a network communication line and simulating browser activity of a given terminal is disclosed. The probe terminal monitors TCP/IP data packets routed through the communication line and filters relevant requests and responses relating to a given IP address. These requests and responses are analyzed and sorted according to their type and content. Based on the analysis, the probe terminal identifies all relevant data transactions relating to the navigation process of a given terminal. The probe terminal activates a virtual browser simulating the processing of identified data transactions to create navigation presentations similar to the navigation presentations as seen by the user of a given terminal.

18 Claims, 6 Drawing Sheets

METHOD OF SURVEILLING INTERNET COMMUNICATION

This application is a Continuation of International Patent Application No. PCT/IL01/00471 with an international filing date of 23 May 2001, the entire contents of the application which is hereby incorporated in its entirety.

BACKGROUND OF THE INVENTION

The present invention is directed to a method and system for enabling surveillance and monitoring of networks communications by analysis of data traversing therethrough.

A huge amount of traffic is flowing through today's computer networks, not all of which is benign. Thus, an owner or supervisor of a given network may be most interested lo be able to track or "listen in" in real time in order to effectively monitor an/or secure the network. Such monitoring or surveillance can be achieved by connecting a probe to the network in order to monitor data traveling between two of more nodes (e.g., user workstations) on the network.

In a system where communication between two nodes is in a form of discrete packets, the network probe can "read" a packet of data in order to gather information, such as regarding the sources and the destination addresses of the packet, or the protocol of the packet In addition, statistical and related information can be computed such as the average or total amount of traffic of a certain protocol type during a given period of time, or the total number of packets being sent to or from a node. This information may be reported to a system administrator in real-time, or may be stored for later analysis.

Various attempts have already been made in this direction. For example, Clear View Network Window, a software program available from Clear Communications Corporation, of Lincolnshire, Ill., U.S.A, allegedly offers predictive/ proactive maintenance, intelligent root-cause analysis, and proof-of-quality reports. However, the output is designed for network fault management, which is not the same as "tapping" into a communication between nodes in the network. Thus, the Clearview system does not allow monitoring of data transferred between two nodes In the network With regard to contents or characteristics.

Livermore National Laboratory, Livermore, Calif., U.S.A, developed a group of computer programs to protect the computers of the U.S. Department of Energy by "sniffing" data packets that travel across a local area network, The United States Navy used one of these programs, known as the "iWatch" program, in order to wiretap on communications of a suspected computer hacker who had been breaking into computer systems at the U.S. Department of Defense and NASA. The iWatch program uses a network probe to read all packets that travel over a network and then "stores" this information in a common database. A simple computer program can then be written to read through the stored data, and to display only predefined "interesting" pieces of information.

Whenever an interesting piece of information is found, the stored data is rescanned and a specific number of characters located at both sides of the "interesting" piece are reported. These interesting characters are then reviewed in order to determine the content of the message and used as, a guide to future monitoring activity, This system is restricted to history analyze of user activities and does not enable complete "tapping" of all user activities and full simulation of the users surfing activity.

Three major problems are encountered in the way of achieving continuous and reliable tracking:
(a) Individual browsers do not report all the activities performed to a web server. For example, when a browser loads web pages from its browser cache space or from a proxy server, it does not send requests to any "remote" web server through the cyberspace autostrade;
(b) Application programs designed to perform certain features by web browser of one manufacturer are usually not compatible with those manufactured by another vendor because browser interface mechanisms are different and proprietary to each one of them; and
(c) Individual browsers send their requests to web servers in a non-systematic order in other words, with regard to a given web server, a preceding request has no relation to a subsequent request. In processing of requests, a web site has no control over the sequences of the requests.

In an attempt to overcome these problems, U.S. Pat. No. 5,951,643 refers to a mechanism for dependably organizing and managing information for web synchronization and tracking among multiple consumer browsers.

However, this solution is limited to tracking activities of identified users, who agreed to be "tapped" and willingly cooperated and be connected to the host with designated application.

It is thus the prime object of the invention to provide a monitoring and surveillance method and system enabling network communication suppliers to tap any user connected to the network.

It is a further object of the invention to provide a tapping methodology enabling network communication suppliers to watch in real time all user activities while communicating a network.

It is a still further object of the invention to enable web-site owner to monitor and tap users contacting their web site

SUMMARY OF THE INVENTION

Thus provided according to the present invention is a method of tracking a network communication line by network probe terminal ("terminal agent") simulating a browser ("original browser") activity of a given terminal comprising the steps of accessing the network communication line, tracing TCP/IP data packets routed through the communication line, selecting TCP/IP data packets relating to a given IP address; ("identified data packets"), selecting from the identified data packets current requests for new connections ("original requests"), selecting from the identified data packets current web-page components indicating new addresses ("new navigation components"), dividing the new navigation components into two categories, embedded objects or frames ("false new components"), hyperlinks ("true new components"), dividing tie original requests into original requests matching true the new components, or original requests failing to match any new connection components and belonging to HTTP or POST type as "primary requests", original requests matching the false components as "secondary requests", selecting from identified data packets, HTML data files relating to primary requests; ("respective primary responses"), generating "virtual" secondary requests according to the respective secondary responses, selecting from identified data packets responses relating to secondary virtual requests, ("respective seconday responses") and simulating web page presentation on the terminal agent according to the respective secondary responses.

BRIEF DESCRIPTION OF THE DRAWINGS

These and further features and advantages of the invention will become more clearly understood in the light of the ensuing description of a few preferred embodiments thereof, given by way of example only, with reference to die accompanying drawings, wherein.

Figure 3:
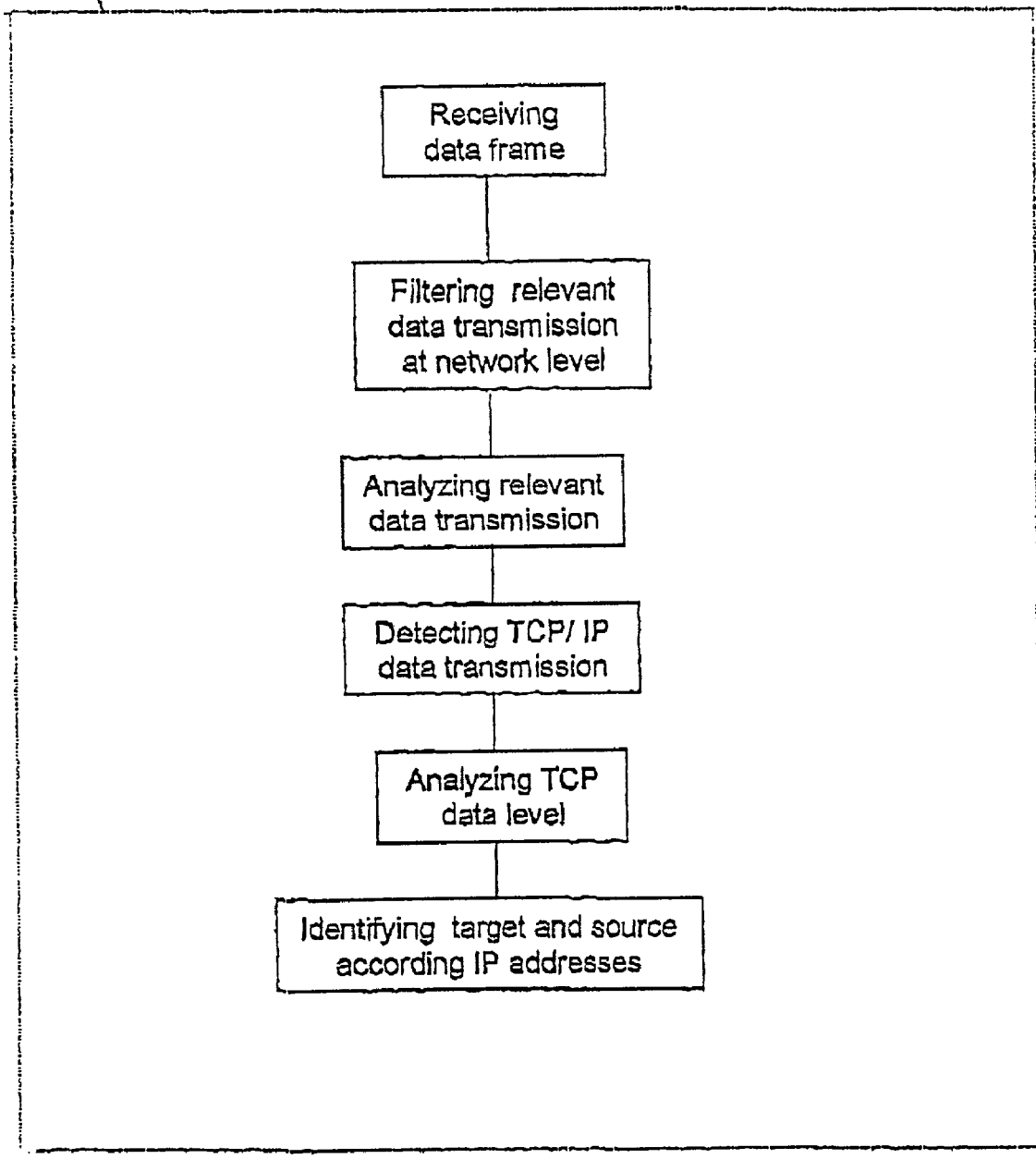
Figure 4:
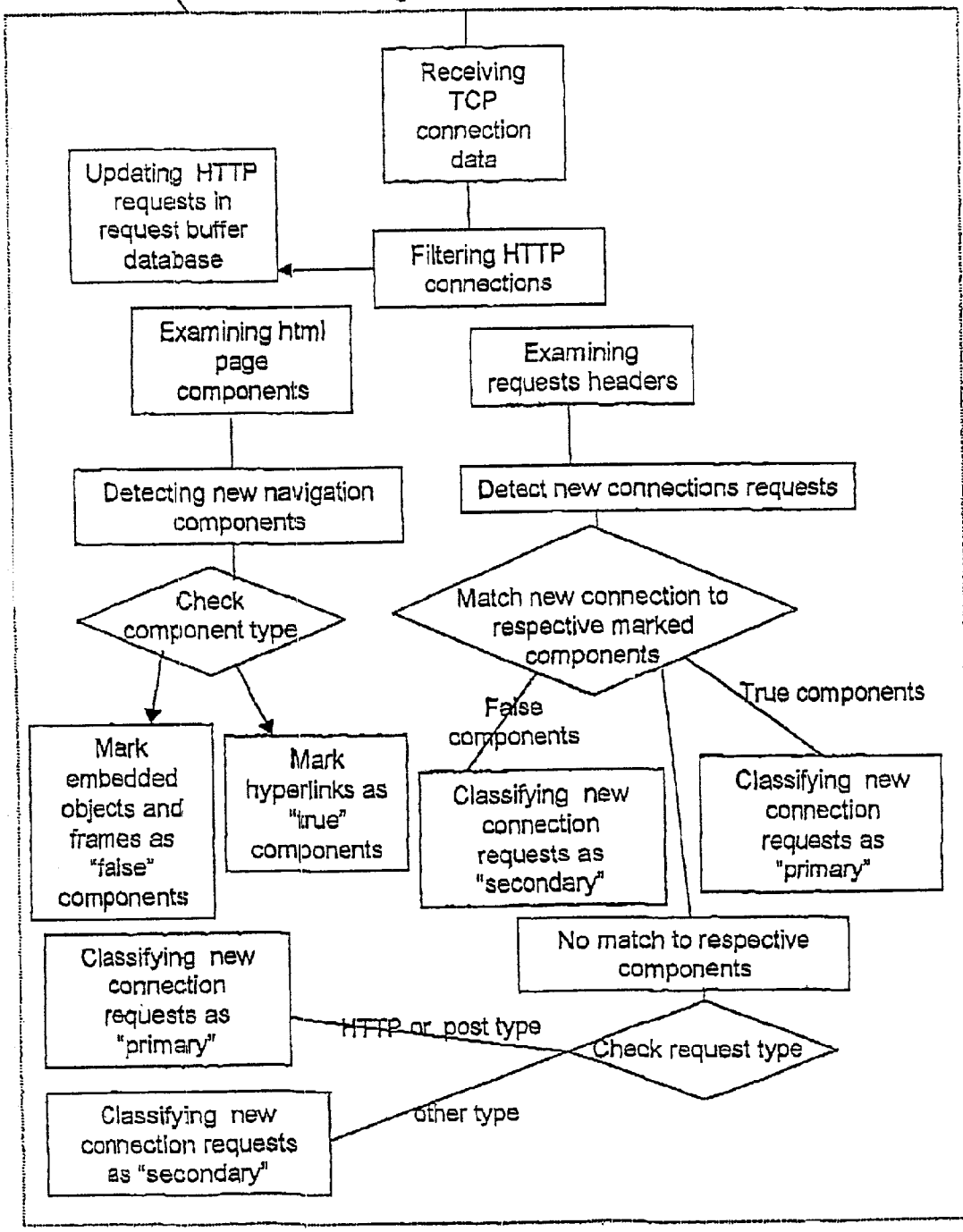
Figure 5:
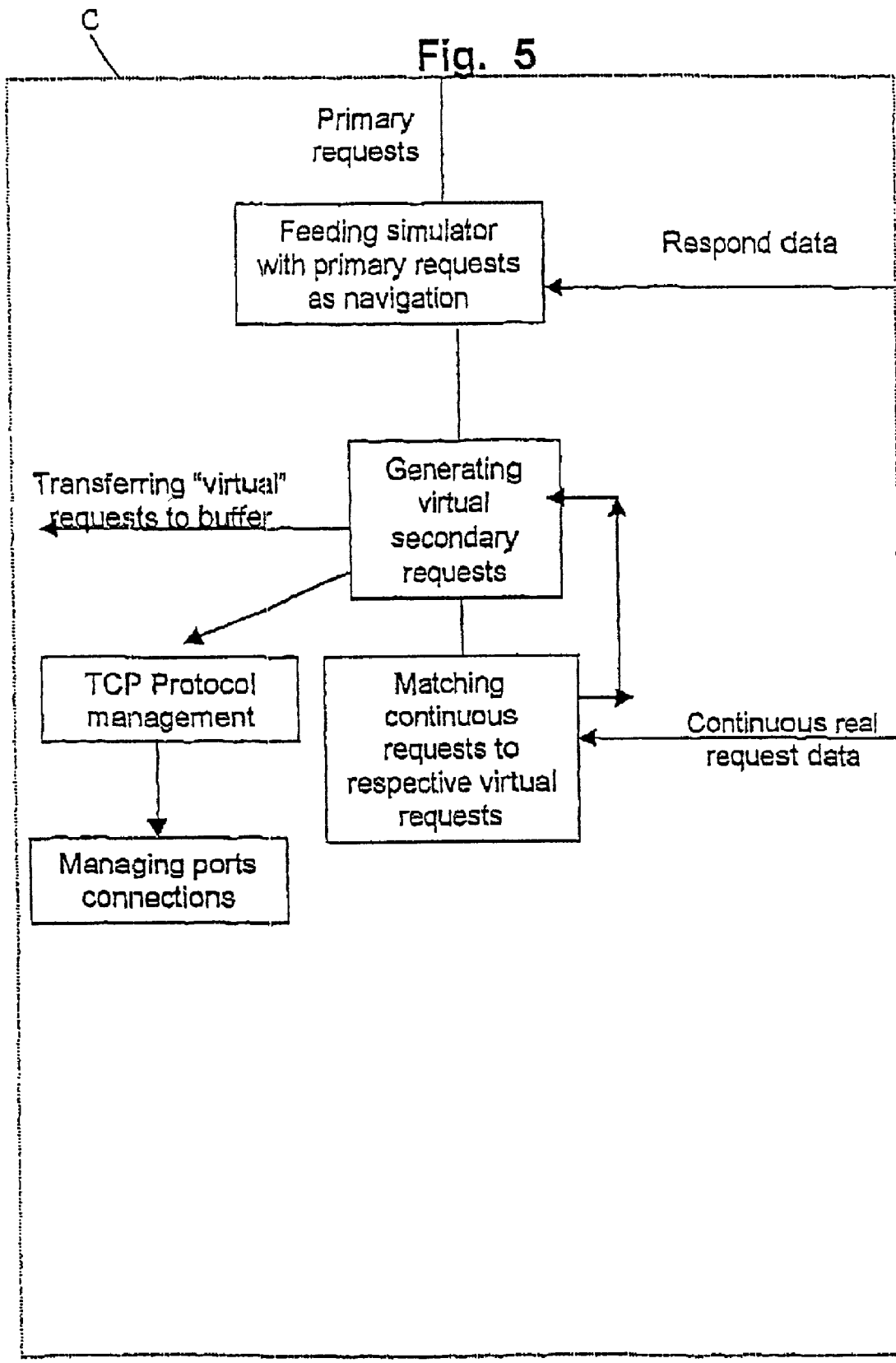
Figure 6:
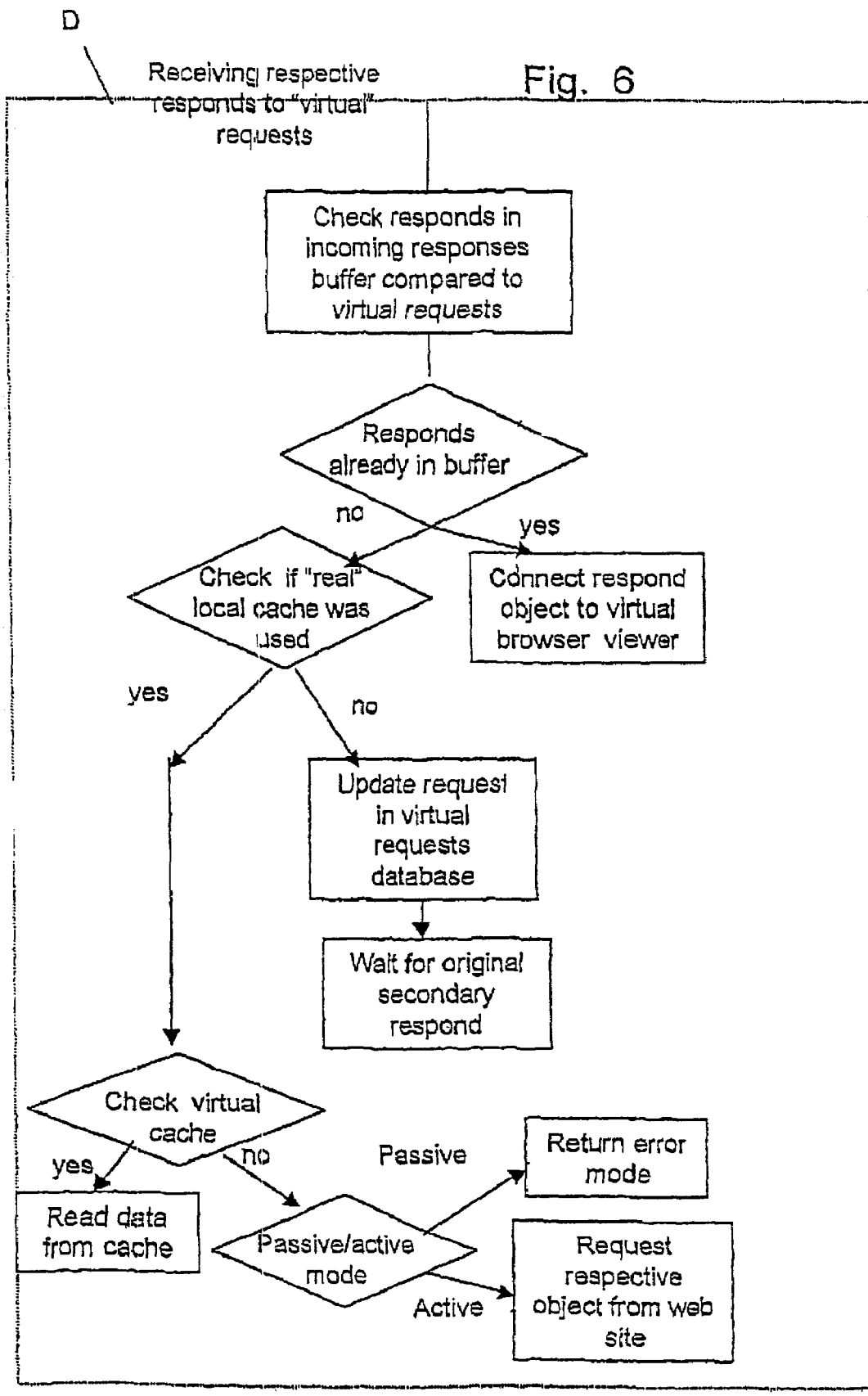

Fig, 2 illustrates the terminal agent scheme of operation;

FIG. 3 illustrates the process of tracing and identifying TCP/IP data packets;

FIG. 4 is a flowchart of classifying TCP/IP requests;

FIG. 5 is a flowchart of simulating the creation of virtual secondary TCP/IP requests; and FIG. 6 illustrates the process of simulating original browser activities.

DETAILED DESCRIPTION OF THE PREFERRED EMBODIMENTS

Figure 1:
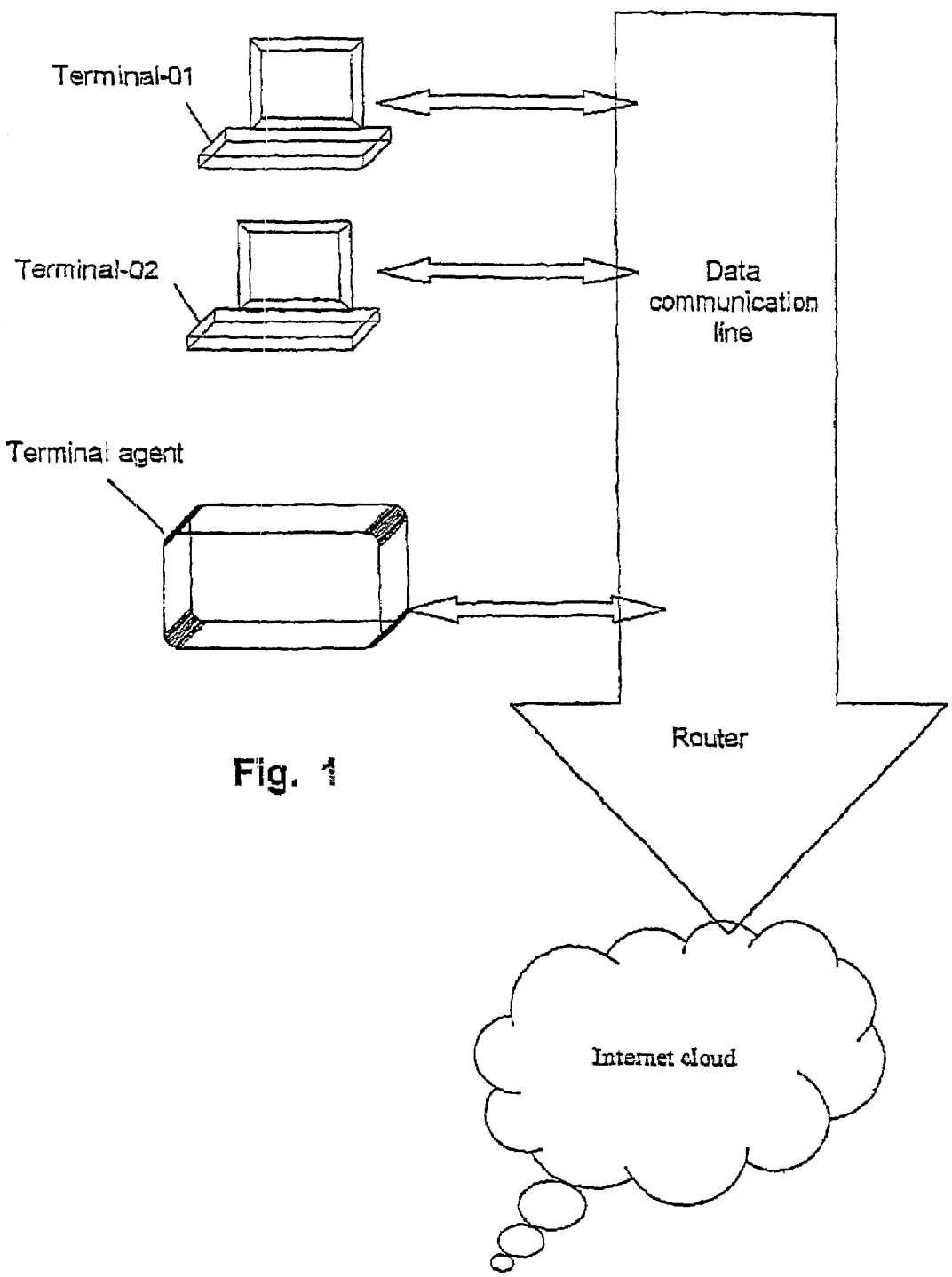
FIG. 1 illustrates a typical network configuration, in which the present invention can be implemented.

Referring to FIG. 1, let us assume that terminals 01, 02 . . . are connected to the same communication line, where the communication line is used as internal network ("Intranet"), or external network such as the Internet. According to the present invention it is proposed to connect a designated network probe (hereinafter called "the Terminal Agent") to the data is communication line. Alternatively, the terminals 01, 02 etc., and the terminal agent may be connected to different data communication lines, or located at different local networks.

Figure 2:
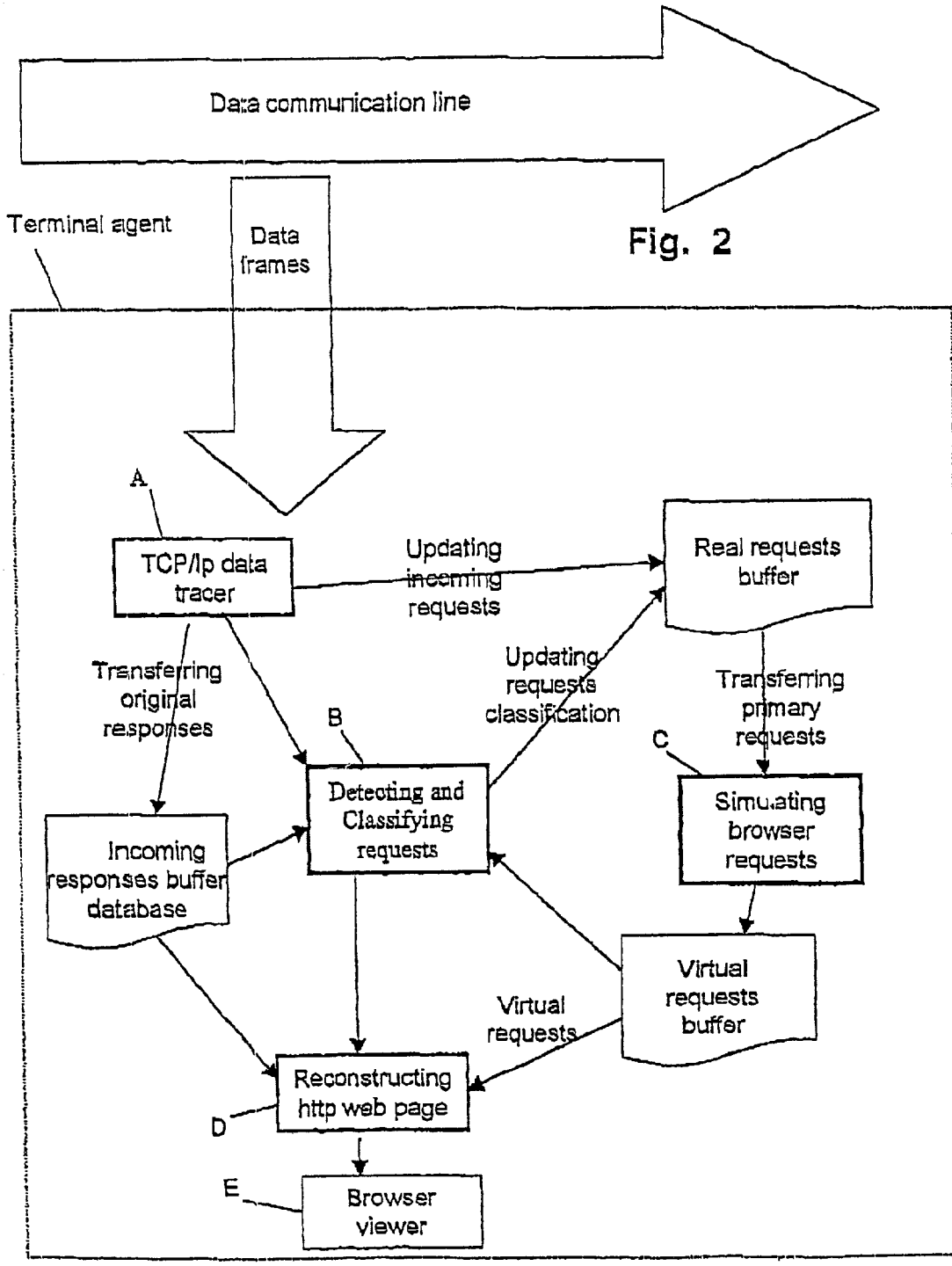

The general scheme of the terminal Agent operation is illustrated in FIG. 2.

The Terminal Agent is exposed to all data frames passing through the communication line. The data frames may contain information transferred between the terminals or external data transmission to external sources such as internet servers.

Let us further assume that the "Owner" of the data communication line, such as ISP or network of a private organization, is interested in monitoring in real time, the actual communication activities of a given terminal when surfing the internet.

The operation of the Terminal Agent is to first analyze the data frames for tracing TCP/IP data packets. As illustrated in FIG. 3, the data analysis is processed according to the different protocol hierarchy (see RFC 0793 of the internet protocol), namely, first to analyze the local network protocol, filtering external data transmission ("gateway level") then identifying internet protocol (IP) data frames, and finally detecting TCP("Transition Control Protocol") data packets of the "host level".

Upon analyzing the IP HEADER of the data packets, the IP addresses of the requesting terminal and of the message destination are identified. The owner of the communication line can easily relate the IP address to the users terminals. Therefore it is possible to filter out all other irrelevant data packets and restrict further processing to data transmission of one selected terminal (hereinafter called "the identified data packets").

The identified data packets are further analyzed according to the RFC 079 specification enabling; full management and control of data communication ports.

According to known routines of managing TCP data communication ports, as processed by conventional browsers, e.g. the Internet Explorer, the terminal which operates the browser is the original source of all data transmission. For example let us assume that the terminal placed a request for YAHOO0! home page, which request is delivered through the network to YAHOO! server. In response, the server sends an. HTML data file containing all information of yahoo home web page components. Accordingly the browser sends new requests for receiving all components of the web-pate by opening new communication "virtual" ports, where each port is used for transmitting different components of the same web-page. An "outsider" terminal, exposed to all data requests and respective responses is unable to differentiate between initial "primary" requests, e.g. requesting the complete YAHOO! home page and "secondary" requests for receiving the components thereof. For simulating the activity of the original browse probe terminal it is essential to identify the primary requests as such.

FIG. 4 Illustrates the process for differentiating the primary requests from the secondary requests. Primary requests are originated from different operations such as entering a new URL by the user, choosing a hyperlink, etc. Therefore, in order tat detect same one must analyze the previous information transmitted to the same IP address. All new navigation components (addressing the browser to new location) of the web page received by the terminal are sorted according to their type, all embedded objects, frames, etc., are marked as "false" components, while hyperlinks are marked as "true" components. All data is stored in the incoming buffer responses database for later use.

When identifying a request for a new connection according to TCP analysis, the request is examined according to the respective navigation components (RNC) in the incoming respond buffer. If the RNC is marked as "false" the request is ignored; if the RNC is marked as "true" the request is classified as primary; otherwise, if there is no RNC relating the said request, the connection type should be identified, If the connection is of an HTML type, or "post" type, it is classified as a primary request, In order to view and monitor the activities of a terminal, all "original" browser activities must be reconstructed. For that purpose it is suggested to use a "virtual" browser. This virtual browser possesses all the capabilities of a "real" browser to download in real time web pages from the Internet. However its connection with the Internet is virtual in the sense that no actual date exchange with the Internet servers is preformed, but only simulating the activities of the original "real" browser.

The first function of the virtual browser is illustrated in FIG. 5. The browser is receiving all primary requests of the "real" browser. These primary requests and the respective primary responses from the Internet are analyzed and processed according to the conventional browser operation. However the outcome of secondary virtual requests (in conventional browser used to complete the process of downloading web page components) are not transferred directly as usual through the Internet to the appropriate server but stored in a the virtual "secondary" requests buffer database Although the virtual browser connection is not "real", all TCP protocol management of opening and controlling ports connection is processed by the terminal agent as if the connections are "real" ones.

The final process of simulating and presenting the web pages in the virtual browser is further illustrated in FIG. 6.

All original secondary responses coming through the communication line are analyzed and recorded in tie incoming responses buffer database. The virtual requests are compared to the respective secondary responses stored in the incoming responses buffer database, by the order of their arrival. If the respective secondary responses already exists in the buffer, these responses are transferred to the virtual browser, and processed (according to conventional browser operation) to present the visual picture, of the respective web page components. As a result, the terminal agent is simulating in real time the exact process of downloading Internet web pages as it has been performed by the original terminal.

In case the respective responses do not appear in the incoming responses buffer database, activity of an original local cache is deduced. If the original local cache was not used with respect to said virtual request, it is suspend in the buffer database until the original secondary respective responses arrive. Otherwise, if the real local cache was used relating to this respond, the local cache of the virtual browser Is examined, and if respective secondary responses exist in the local cache, then the respective respond is transferred to the virtual browser and processed as described above, In case the respective responses do not exist in the virtual cache, either of the following alternatives may be applied. According to one, "passive" version of the terminal agents, no further action is taken to find the "missing" respond, and an "error" message will appear at the agent terminal instead of the web page component which appeared in the real terminal. According to this version, the simulation of the real terminal is not complete but the tapping activity is undetectable. According to another, "active" version, the terminal agent addresses the web page server to request the "missing" respond. Although this version enables the terminal agent to present more exact picture of the real terminal activities, it is traceable for more experienced terminal users, who are able to detect the tapping activity.

According to a further mode of implementation of the of the present invention, it is proposed to tap not only to related web page data packets, but to trace also related messages data packets e.g. e-mail or chats. To enables such tapping, the same method and principals as described above are applied at request for receiving and sending messages through the network other than requests for web pages. The process of analyzing such requests and the respective responses is more streamlined since there is no need to check the cache memory activity, as by definition such information is always new.

Finally, it should be appreciated that the above-described embodiments are directed to Internet communication environment. However, the invention in its broad aspect is equally applicable to computerized network communication in general, such as satellite, cellular and others.

While the above description contains many specificities, these should not be construed as limitations on the scope of the invention, but rather as exemplification of the preferred embodiments. Those skilled in the art will envision other possible variations that are within its scope, Accordingly, the scope of the invention should be determined not by the embodiments illustrated, but by the appended claims and their legal equivalents.

What is claimed is:

1. A method of tracking a network communication line by a first terminal simulating original browser activity of a second terminal, the method comprising:
   accessing the network communication line,
   tracing TCP/IP data packets routed through the network communication line,
   selecting TCP/IP data packets relating to an IP address as identified data packets,
   selecting from the identified data packets current requests for new connections as original requests,
   selecting from the identified data packets current web page components indicating new addresses as new navigation components,
   organizing the new navigation components into at least a false new components category comprising at least embedded objects or frames and a true new components category comprising at least hyperlinks,
   organizing the original requests into at least a primary request category comprising original requests matching those in the true new components category or original requests failing to match any of those in the true new components category and belonging to HTTP or POST type and a secondary request category comprising original requests matching those in the false new components category or original requests failing to match any of those in the false new components category and not belonging to HTTP or POST type,
   selecting, from the identified data packets, HTML data files relating to primary requests as respective primary responses,
   generating virtual secondary requests according to the respective secondary responses,
   selecting respective secondary responses from the identified data packet responses relating to secondary virtual requests, and
   simulating web page presentation on the first terminal according to the respective secondary responses.

2. The method of claim 1 comprising:
   selecting virtual secondary requests not matching any respective secondary responses as unanswered secondary requests,
   retrieving content from a local cache of the first terminal as virtual cache if original browser local cache was used relating to unanswered secondary requests,
   simulating web page presentation on the first terminal according to data relating to the unanswered secondary requests if the virtual cache contains said data, and
   displaying error messages on the first terminal if the virtual cache does not contain data relating to the unanswered secondary requests.

3. The method of claim 2 comprising:
   addressing via the network communication line to an appropriate Internet server for receiving respective simulated responses relating to unanswered secondary requests if the virtual cache does not contain data relating to the unanswered secondary requests.

4. The method of claim 1 comprising:
   selecting from identified TCP/IP data packets data relating to network messages,
   transforming the data relating to network messages data into a text data file, and displaying the text data file on the first terminal.

5. The method of claim 1 wherein a network comprising the network communication line comprises a local-area network (LAN) and the first and second terminals are connected to the network.

6. The method of claim 1 wherein the network communication line comprises an external communication line comprising at least one of a telephone line, an ISDN line, and an optical line.

7. The method of claim 1 wherein a network comprising the network communication line comprises a local-area network (LAN) and the first terminal is situated in a location different from that of the second terminal.

8. The method of claim 1 wherein the IP address is identified by a communication line provider.

9. The method of claim 1 wherein the IP address is identified by a communication line owner.

10. The method of claim 1 wherein the IP address is an address of a web site visitor and identified by a web site owner.

11. A network probe terminal for tracking a network communication line and simulating an original browser activity of a terminal, comprising:

connection means for accessing the network communication line, monitoring means for tracing TCP/IP data packets routed through the network communication line, a first filtering module for selecting new connection requests as original requests and web page components indicating new addresses as new navigation components out of TCP/IP data packets relating to an IP address as identified data packets, first sorting means for organizing the new navigation components into at least a false new components category comprising at least embedded objects or frames and a true new components category comprising at least hyperlinks, second sorting means for organizing the original requests into at least a primary request category comprising original requests matching those in the true new components category or original requests failing to match any of those in the true new components category and belonging to HTTP or POST type and a secondary request category comprising original requests matching those in the false new components category or original requests failing to match any of those in the false new components category and not belonging to HTTP or POST type, a classifying module for selecting HTML data files relating to primary requests as primary responses from the identified data packets, a request generating module for creating virtual secondary requests according to respective secondary responses, a second filtering module for selecting responses relating to secondary virtual requests as secondary responses from identified data packets, and displaying means for simulating web page presentation on a terminal agent according to the secondary responses.

12. The device of claim 11 wherein the second filtering module comprises means for selecting virtual secondary requests currently not matching any respective original responses as unanswered secondary requests.

13. The device of claim 11 comprising a cache module for activating a local cache in the terminal agent in case an original browser local cache has been used in response to unanswered secondary requests.

14. The device of claim 13 comprising a retrieval module for addressing via the network communication line to an appropriate internet server and receiving respective simulated responses relating to unanswered secondary requests if a virtual local cache does not contain data.

15. The device of claim 11 comprising an electronic message module for selecting from identified TCP/IP data packets data relating to network messages, transforming the data relating to network messages into a text data file, and displaying the text data file on the terminal agent.

16. The device of claim 11 wherein the IP address is identified by a communication line provider.

17. The device of claim 11 wherein the IP address is identified by a communication line owner.

18. The device of claim 11 wherein the IP address is an address of a web site visitor and identified by a web site owner.

* * * * *